United States Patent
Hassan et al.

(10) Patent No.: US 10,707,922 B2
(45) Date of Patent: Jul. 7, 2020

(54) SPATIAL HOPPING USING ANTENNA SETS ACROSS MULTIPLE BASE STATIONS

(71) Applicant: Microsoft Technology Licensing, LLC, Redmond, WA (US)

(72) Inventors: Amer Hassan, Kirkland, WA (US); Edward Giaimo, Bellevue, WA (US); Paul Mitchell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 15/643,005

(22) Filed: Jul. 6, 2017

(65) Prior Publication Data
US 2019/0013841 A1  Jan. 10, 2019

(51) Int. Cl.
*H04B 7/024* (2017.01)
*H01Q 1/24* (2006.01)
(Continued)

(52) U.S. Cl.
CPC ............ *H04B 7/024* (2013.01); *H01Q 1/246* (2013.01); *H01Q 21/06* (2013.01);
(Continued)

(58) Field of Classification Search
CPC ........ H01Q 1/246; H01Q 21/06; H01Q 21/24; H04B 7/024; H04B 7/0417; H04B 7/0628;
(Continued)

(56) References Cited

U.S. PATENT DOCUMENTS

| 6,016,123 A | 1/2000 | Barton et al. |
| 7,509,145 B2 | 3/2009 | Ranta et al. |

(Continued)

FOREIGN PATENT DOCUMENTS

| CA | 2215079 A1 | 3/1999 |
| WO | 2014045186 A1 | 3/2014 |

OTHER PUBLICATIONS

Park, et al., "Low Complexity Antenna Selection for Low Target Rate Users in Dense Cloud Radio Access Networks", In IEEE Transactions on Wireless Communications,vol. 15 ,Issue 9, Jun. 14, 2016, pp. 6022-6032.

(Continued)

*Primary Examiner* — Un C Cho
*Assistant Examiner* — Shah M Rahman
(74) *Attorney, Agent, or Firm* — NovoTechIP International PLLC

(57) ABSTRACT

A network controller is configured to receive a data packet from a core network for routing to a device in a wireless network. The controller may then select an antenna set from a plurality of antenna sets that are distributed across different base stations operable to transmit data packets to the destination device. The antenna set may be selected from the plurality of antenna sets based on a distribution pattern. For example, the distribution pattern may be a pseudo-randomly generated distribution pattern. The controller may then route the at least one data packet to the base station which the selected antenna set is implemented for transmission to the device. The antenna sets may be implemented on one base station, or implemented so that the antennas of an antenna set are distributed across multiple base stations. The antenna sets may also be configured to be of any number of antennas.

19 Claims, 6 Drawing Sheets

(51) Int. Cl.
*H01Q 21/06* (2006.01)
*H04B 7/06* (2006.01)
*H04B 7/0417* (2017.01)
*H04W 72/04* (2009.01)
*H04L 5/00* (2006.01)

(52) U.S. Cl.
CPC ........... *H04B 7/0417* (2013.01); *H04B 7/063* (2013.01); *H04B 7/0628* (2013.01); *H04W 72/0486* (2013.01); *H04L 5/0058* (2013.01)

(58) Field of Classification Search
CPC ..... H04B 7/063; H04L 5/0058; H04L 5/0035; H04W 72/0486; H04W 72/048; H04W 72/1252; H04Q 21/24
See application file for complete search history.

(56) References Cited

U.S. PATENT DOCUMENTS

| | | | |
|---|---|---|---|
| 8,259,834 B2 | 9/2012 | Rofougaran | |
| 8,964,874 B2 | 2/2015 | Yuan et al. | |
| 2007/0041457 A1 | 2/2007 | Kadous et al. | |
| 2008/0152030 A1* | 6/2008 | Abramov | H04B 7/0617 375/260 |
| 2010/0322351 A1* | 12/2010 | Tang | H04B 7/024 375/316 |
| 2012/0135771 A1* | 5/2012 | Futaki | H04B 7/024 455/509 |
| 2013/0077658 A1* | 3/2013 | Hui | H04B 7/0615 375/219 |
| 2013/0114524 A1* | 5/2013 | Sirotkin | H04L 1/0026 370/329 |
| 2013/0156013 A1* | 6/2013 | Huang | H04W 72/04 370/336 |
| 2013/0308562 A1 | 11/2013 | Matin et al. | |
| 2013/0322235 A1* | 12/2013 | Khoryaev | H04W 24/10 370/229 |
| 2014/0243002 A1* | 8/2014 | Muruganathan | H04W 72/0426 455/450 |
| 2014/0355444 A1* | 12/2014 | Turtinen | H04W 8/005 370/235 |
| 2015/0139186 A1* | 5/2015 | Kim | H04W 48/14 370/331 |
| 2016/0105834 A1* | 4/2016 | Gupta | H04L 5/00 370/332 |
| 2016/0105882 A1 | 4/2016 | Park et al. | |
| 2016/0248561 A1* | 8/2016 | Davydov | H04W 72/042 |
| 2016/0277086 A1 | 9/2016 | Choi et al. | |
| 2016/0309466 A1* | 10/2016 | Chen | H04B 7/2628 |
| 2017/0006641 A1* | 1/2017 | Dinan | H04W 74/0833 |
| 2017/0142751 A1* | 5/2017 | Liu | H04L 5/1415 |
| 2017/0272219 A1* | 9/2017 | Park | H04W 72/0486 |
| 2017/0331670 A1* | 11/2017 | Parkvall | H04L 41/0816 |
| 2018/0279218 A1* | 9/2018 | Park | H04W 36/0069 |
| 2018/0323858 A1* | 11/2018 | Bergstrom | H04B 7/0404 |
| 2019/0007996 A1* | 1/2019 | Boudreau | H04L 5/0035 |
| 2019/0074876 A1* | 3/2019 | Kakishima | H04L 5/0007 |

OTHER PUBLICATIONS

"International Search Report with Written Opinion Issued in PCT Application No. PCT/US2018/034524", dated Aug. 9, 2018, 14 Pages.

* cited by examiner

SPATIAL HOPPING USING ANTENNA SETS ACROSS MULTIPLE BASE STATIONS

BACKGROUND

Wireless networks that support multiple types of wireless devices have become ubiquitous. Wireless network environments may include, for example, environments in which mobile phone networks using cellular technology are deployed or business/organizational environments in which wireless local access networks (WLANs) using Wi-Fi technology are deployed. These networks may be required to support a large number of users using many different types of devices. As technology evolves, the numbers and the types of these devices and the sophistication of the device applications are constantly increasing. This increase in the number and in the types of mobile devices that support increasingly sophisticated device applications requires that these networks support higher performance traffic, at higher traffic volumes, while providing a level of service that is satisfactory for all users on a network.

SUMMARY

This summary is provided to introduce a selection of concepts in a simplified form that are further described below in the Detailed Description. This summary is not intended to exclusively or exhaustively identify key features or essential features of the claimed subject matter. Nor is it intended as an aid in determining the scope of the claimed subject matter.

This disclosure presents methods, apparatus, and systems for providing spatial diversity when transmitting data from a multi-base station network to a device operating in the network. Use of the methods, apparatus, and systems allows spatial diversity to be achieved by distributing the transmission of data from a network to a device across different antenna sets, where the antenna sets are implemented on different base stations at different locations within the network's coverage area.

In an implementation, a controller is configured to receive a group of data bits from a core network for routing to a destination device operating within a wireless network. In response to receiving the group of data bits, the controller may select an antenna set from a plurality of antenna sets in the wireless network and route the group of data bits to a base station associated with the selected antenna set for transmission to the destination device. The plurality of antenna sets may be distributed across different base stations operable to transmit data to the destination device in the wireless network and the selection of an antenna set may be performed by selecting the antenna set from the plurality of antenna sets based on a distribution pattern. In one example, the distribution pattern may be a pseudo-randomly generated distribution pattern that comprises a pseudo-randomly generated list of antenna sets of the plurality of antenna sets. The antenna sets may be configured so that an antenna set may be implemented on one base station, or implemented so that the antennas of an antenna set are distributed across multiple base stations. The antenna sets may also be configured to be of any number of antennas. For example, each antenna set may be configured as a single antenna implemented on a single base station, as two or more antennas implemented on a single base station, or as two or more antennas distributed across multiple base stations. The selection of an antenna set based on the distribution pattern, and the routing of the group of data bits to the base station or base stations on which the selected antenna is implemented, may be repeated for each subsequently received group of data bits that is addressed to the destination device. By repeating the selection of the antenna set in this manner for each of the subsequently received groups of data bits of a sequence of data bits, spatial diversity may be achieved for the transmission of the sequence of data bits to the destination device. In an example implementation, the group of data bits may comprise a data packet or a plurality of data packets.

In another implementation, an activity level associated with each antenna set of the plurality of antenna sets may be considered during the selection of an antenna set for transmission of a group of data bits to the destination device. In this implementation, the controller performs the selection of an antenna set for a group of data bits received from the core network by identifying an antenna set from the plurality of antenna sets based on the distribution pattern, determining if an activity level associated with the identified antenna set is below a threshold level, and, if the activity level is below the threshold level, selecting the antenna set from the plurality of antenna sets and routing the group of data bits to a base station associated with the selected antenna set for transmission to the destination device. Alternatively, if the activity level is at or above the threshold level, the controller may identify another antenna set from the plurality of antenna sets and repeat the process, until an antenna set having an associated activity level below the threshold is identified and selected. The activity level associated with the identified antenna set may be a measure of the activity of at least one base station on which the identified antenna set is implemented.

DETAILED DESCRIPTION

Figure 1:
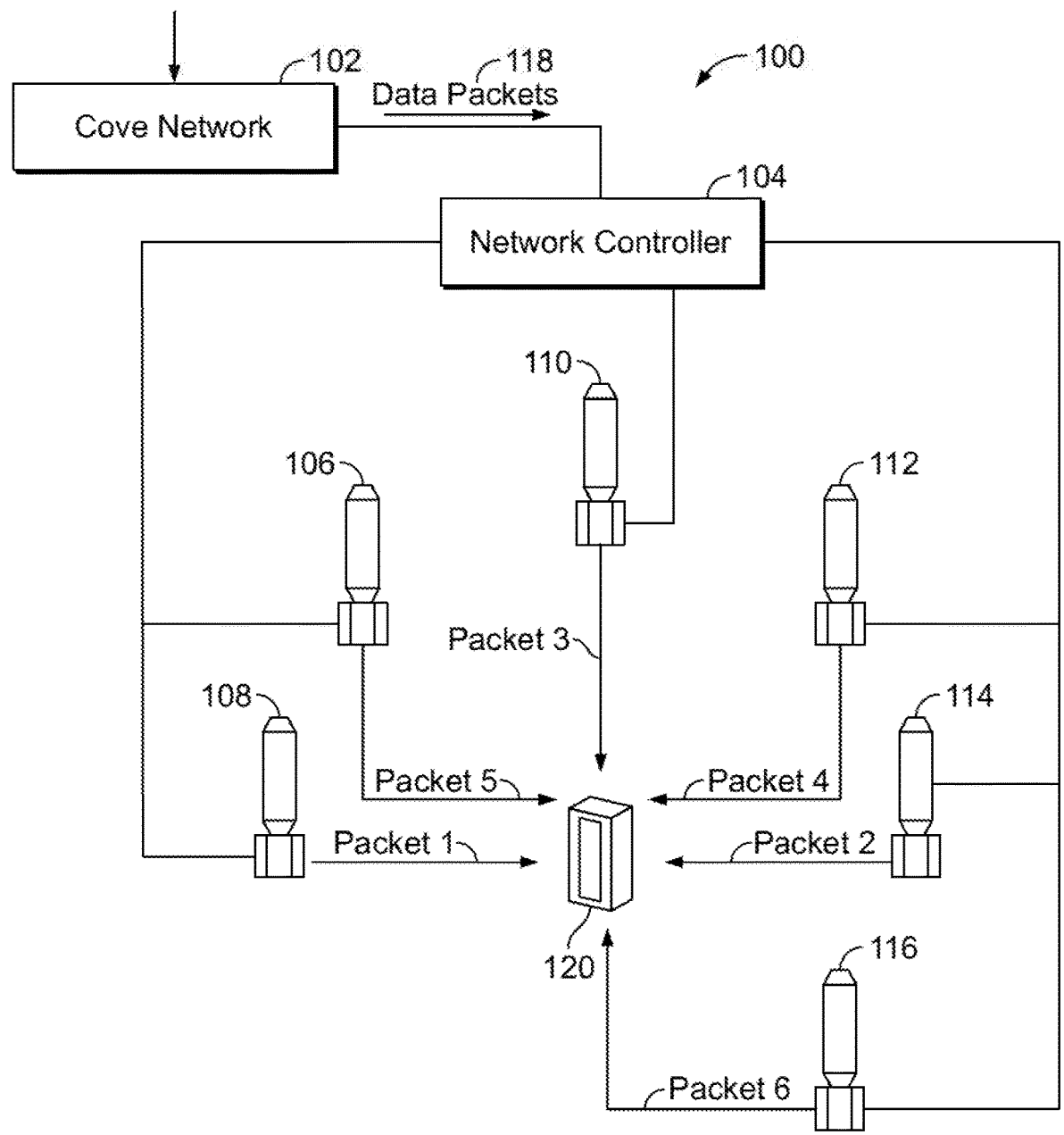
FIG. 1 is a diagram illustrating a wireless network including example devices configured to operate according to the embodiments.

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus that utilize the layout and/or structure of a wireless network to provide spatial diversity for antenna transmissions in an adaptable and efficient way. The disclosed embodiments may provide advantages in various types of wireless network that use multiple base stations.

For example, an implementation may provide advantages in a wireless network including picocells and/or microcells configured using low power base stations. A typical wireless network using picocells and/or microcells is implemented to provide wireless coverage over an area having a high density of device users and/or large volumes of data traffic. For example, wireless networks using picocells and/or microcells may be implemented to provide wireless coverage in the downtown area of a city, in a shopping mall, in an airport, on a corporate campus, on a university campus, or within a sports stadium. The picocells of these wireless networks may be implemented using low power base stations that, for example, may have a range (cell width) of up to 200 meters or less. The microcells of these wireless networks may be implemented using low power base stations that, for example, may have a range (cell width) of up to 2 kilometers. One typical way of configuring picocells/microcells in a wireless network is by deploying base stations in a multiple-input-multiple-output (MIMO) antenna configuration. In a MIMO antenna configuration, the base stations and devices transmit and receive using multiple antennas in an M×N configuration. In the M×N configuration, a base station transmits to and receives from a device using a set of M base station antennas while a device transmits to and receives from a base station using a set of N device antennas. A MIMO configuration having a large number of base stations, each with a large number of antennas implementing picocells and/or microcells, may be termed a Massive-MIMO configuration. A Massive-MIMO configuration may be implemented using picocells and/or microcells in areas of a network that are crowded with users and where traffic congestion occurs. In a Massive-MIMO network, there may be hundreds of antennas that are implemented on a large number of base stations, each including multiple antennas, configured throughout the network.

In a wireless network configured with picocells and/or microcells as described above, a device user may be moving about a crowded and congested coverage area of the network and cause an obstruction to come between the user's device and a base station from which the device is receiving groups of data bits. This may cause one or more groups of data bits, or all groups of data bits of a sequence of groups of data bits transmitted from the base station to the user's device to not be received by the user's device. In such a situation, use of the systems, methods and apparatus would provide an advantage by causing groups of data bits of the sequence of groups of data bits to be randomly distributed in the network for transmission from different antenna sets of different base stations within the location area of the user's device. Because the transmissions of the individual groups of data bits of the sequence of groups of data bits would be distributed about the user's location area and spatially diversified along different transmission paths, the effects of the obstruction coming between the user and any transmitting base station may be prevented or minimized. Also, because alternate groups of data bits in the sequence of groups of data bits may be randomly distributed among the different transmission paths, the effects of transient disturbances and obstructions caused by the user's movement would be randomized among the groups of data bits of the sequence. In this case, use of the embodiments may allow more groups of data bits of the sequence of groups of data bits to be received at the user's device as compared to the case in which the device was receiving the sequence of groups of data bits from one obstructed transmitting base station. Depending on the error correction coding and/or retransmission scheme used in the network, the fact that more groups of data bits of the sequence may be received at the user's device may also allow missed data bits to be more easily recovered at the user's device.

The transmission of alternate groups of data bits of a sequence of groups of data bits to a device using different antenna sets of different base stations allows the transmissions to be made over many different transmission paths. In an example wireless network having a Massive MIMO configuration, use of the implementations may take advantage of the large number of antenna sets implemented on a large number of base stations to provide a high degree of spatial diversity. The embodiments also provide an advantage in that each of the groups of data bits may be efficiently configured as any type of data packet.

Depending on a wireless network's configuration and geographic location, the spatial diversity provided by the embodiments also may be useful in wireless networks implemented to include different numbers of base stations and cells of other sizes. For example, the embodiments may be useful in networks including macro cell configurations having a larger cell width that may be, for example, up to 5 kilometers. The embodiments may also be useful in networks including femto cells that have a smaller cell width that may be, for example, only up to 10 meters.

In a further embodiment, the spatial diversity provided by transmitting alternate groups of data bits of a sequence of groups of data bits to a device from different base stations over many different transmission paths may be combined with network data traffic considerations for more efficient implementation. For example, an activity level associated with each antenna set of a plurality of antenna sets may be considered during the selection of an antenna set for use in transmitting a group of data bits. In this embodiment, during the selection process, an activity level associated with an antenna set identified as a potential candidate for selection may be considered before actually selecting the antenna set for use. The consideration of the activity level may include determining if the activity level is below a threshold level, and if the activity level is below the threshold level, selecting the antenna set for use. Alternatively, if the activity level is at or above the threshold level, the controller may identify another antenna set from the plurality of antenna sets and repeat the process until an antenna set is selected. The activity level associated with the identified antenna set may be a measure of the activity of an associated base station on which the identified antenna set is implemented. For example, the activity level may be a measure of the fill level of a buffer storing queued groups of data bits for transmission from the identified antenna set on the associated base station, or a measure of the fill level of an input buffer storing queued groups of data bits for processing by the associated base station. The activity level may also be a more generic measure, for example, a measure of traffic throughput of the associated base station. If the identified antenna set is implemented over multiple base stations, the activity level may be based on a measure made at one of the base stations on which the antenna set is implemented, or on an average value of a measure made at each of the multiple base stations.

FIG. 1 is a diagram illustrating a wireless network including example devices configured to operate according to the embodiments. Wireless network 100 includes network controller 104, device 120, and base stations 106, 108, 110, 112, 114, and 116. In operation, network controller 104 receives groups of data bits that may each comprise one or more data packets 118 from core network 102 for routing to a destination device, such as device 120, through one of base stations 106, 108, 110, 112, 114, and 116. Core network 102 may be any type of network that provides groups of data bits or data packets addressed to destination devices. For example, core network 102 may be the internet or a Multi-protocol Label Switching (MPLS) network providing data packets, each including a MAC-ID identifying a device to which the data packet is addressed. Device 120 may communicate over an air interface with one or more of base stations 106, 108, 110, 112, 114, and 116 which cover the area in which device 120 is located. Network 100 may comprise more or less base stations than are shown in FIG. 1.

In an implementation, base stations 106, 108, 110, 112, 114, and 116 may each be configured to implement a picocell or microcell to provide a coverage area for network 100. Each of base stations 106, 108, 110, 112, 114, and 116 may include one or more antennas and be capable of communicating with devices using a single antenna or an M×N MIMO antenna configuration. A plurality of antenna sets for network 100 may be configured that each includes a single antenna or more than one antenna. Each of the antenna sets may be associated with the base station, or the base stations, on which the one or more antennas of the antenna set are implemented. In various implementations of network 100, base stations 106, 108, 110, 112, 114, and 116 may be configured to communicate with devices according to an air interface protocol such as an IEEE 802.11 Wi-Fi standard, the 3rd Generation Cellular (3G) standard, the $4^{th}$ Generation Cellular (4G) standard, the wide band code division multiple access (WCDMA) cellular standard, the Long Term Evolution (LTE) cellular standard, or a $5^{th}$ generation cellular standard. As used in this disclosure, the term base station is meant to include any base station, access point, transmitter station, or other type of apparatus/device that provides a communications interface between a network and a wireless device. Device 120 may represent any type of wireless device, such as a mobile phone, a laptop, a tablet device, a gaming/media device, a personal computer, or any other type of wireless device configured to receive data packets from base stations 106, 108, 110, 112, 114, and 116.

In the implementation of FIG. 1, network controller 104 may receive the sequence of data packets 118 addressed to device 102 from core network 102. Network controller 104 processes the data packets 118 and routes alternate groups of one or more data packets of data packets 118 to a different antenna set/base station of base stations 106, 108, 110, 112, 114, and 116 by selecting an antenna set of the plurality of antenna sets for network 100 based on a pseudo-random distribution pattern. Based on the antenna set selection, network controller 104 routes the groups of one or more packets to the base station on which the selected antenna set is implemented. In various implementations, network controller 104 may receive a sequence of any type or grouping of data bits, in a packet format or otherwise, process the groups of data bits, and route alternate groups of one or more groups of data bits to a different antenna set/base station of base stations 106, 108, 110, 112, 114, and 116.

FIG. 1 shows an example scenario in which network controller 104 receives a group of data packets 118 addressed to device 102. The group of data packets 118 comprises the sequence of packet 1, packet 2, packet 3, packet 4, packet 5, and packet 6. Upon receiving each data packet of the group of data packets 118, network controller 104 selects an antenna set from a plurality of antenna sets implemented in network 100, where the selection is performed on a pseudo-random basis. Network controller 104 then routes each data packet to a base station associated with the selected antenna set. In the scenario of FIG. 1, network controller 104 is shown routing packet 1 to base station 108, packet 2 to base station 114, packet 3 to base station 110, packet 4 to base station 112, packet 5 to base station 106, and packet 6 to base station 116 for transmission to device 120 based on association of the base stations with the selected antenna sets. In other example implementations, network 100 may include any number of base stations and/or antenna sets to which data packets may be routed for transmission to device 120. Also, the plurality of antennas of the network 100 from which the antenna sets are pseudo-randomly selected may be a subset of the antennas of the network. For example, the antennas from which the antenna sets for transmitting the data packets are selected may be antennas that are implemented on base stations located within a certain distance of device 120, or antennas implemented in an area of network 100 in which device 120 is located.

In another implementation, the selection and routing functions described for FIG. 1 may be utilized to provide spatial diversity on the uplink in a repeater system or mesh network in which wireless relay nodes transmit on uplinks to a core network via a wireless gateway. For example, a controller that receives data packets from a mobile device for routing to a wireless relay node (e.g., a repeater or mesh node) for uplink transmission may be configured to receive data packets from the mobile device and then randomly select antenna sets of different wireless relay nodes on which to transmit the uplink data packets to the wireless gateway.

Figure 2A:
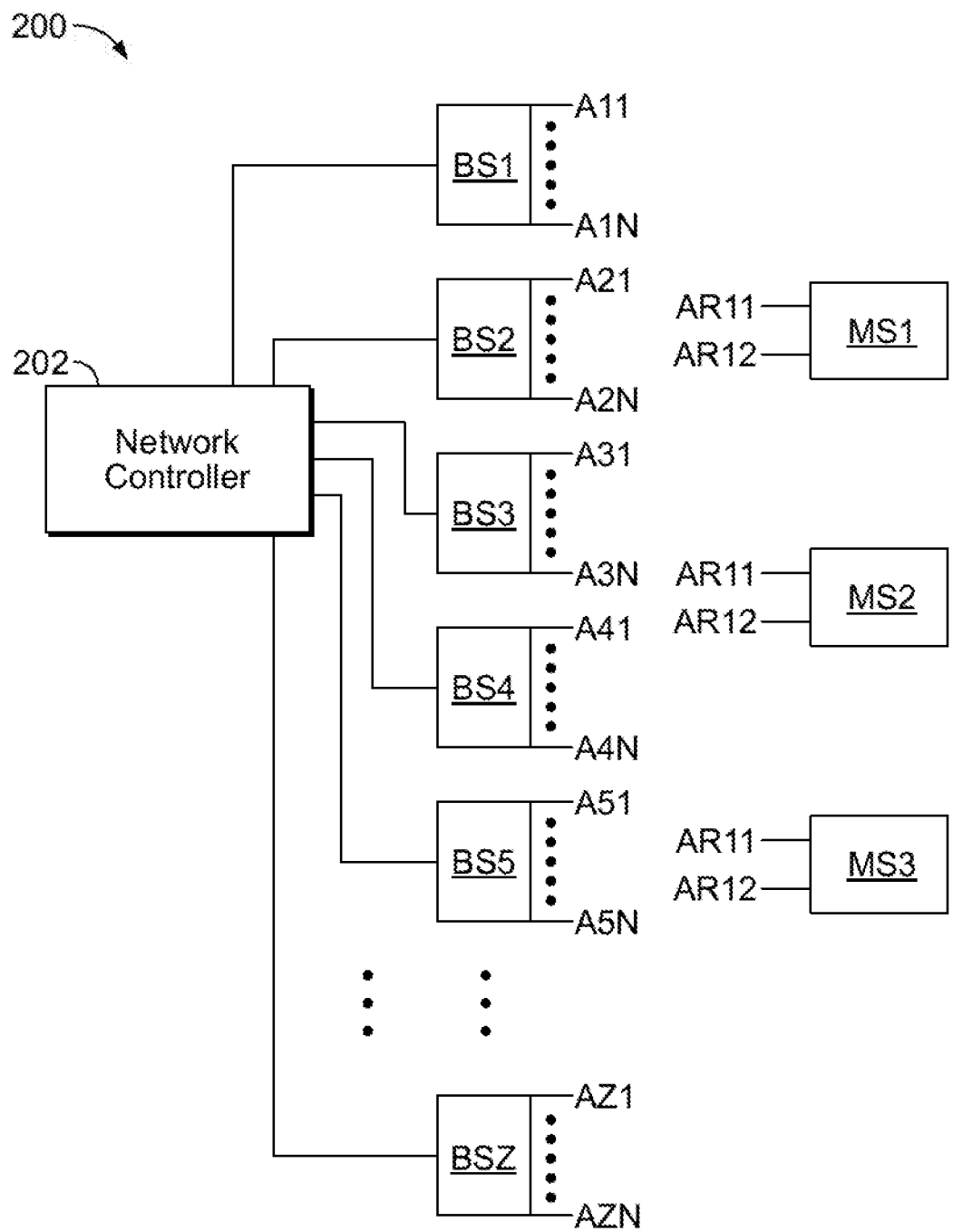
FIG. 2A is a diagram illustrating an example base station/antenna configuration that may be utilized in the embodiments.

FIG. 2A is a diagram illustrating an example base station/antenna configuration that may be utilized in the embodiments. FIG. 2A shows example wireless network 200 including a network controller 202 that is coupled to base stations BS1-BSZ. Each of base stations BS1-BSZ is shown as having N antennas. For example, base station BS1 has antennas A11 . . . , A1N, and base station BSZ has antennas AZ1 . . . , AZN. Z and N may each be any value that represents the number of base stations and antennas per base station, respectively, in network 200. In an implementation, network controller 202 may be configured as network controller 104 and base stations BS1-BSZ may be configured as base stations 106-116, respectively, in network 100 of FIG. 1. FIG. 2A also shows mobile stations or mobile devices MS1-MS3. Mobile device MS1 has antennas A11 to A1N, mobile device MS2 has antennas A21 to A2N, and mobile device MS3 has antennas A31 to A3N.

Figure 2B:
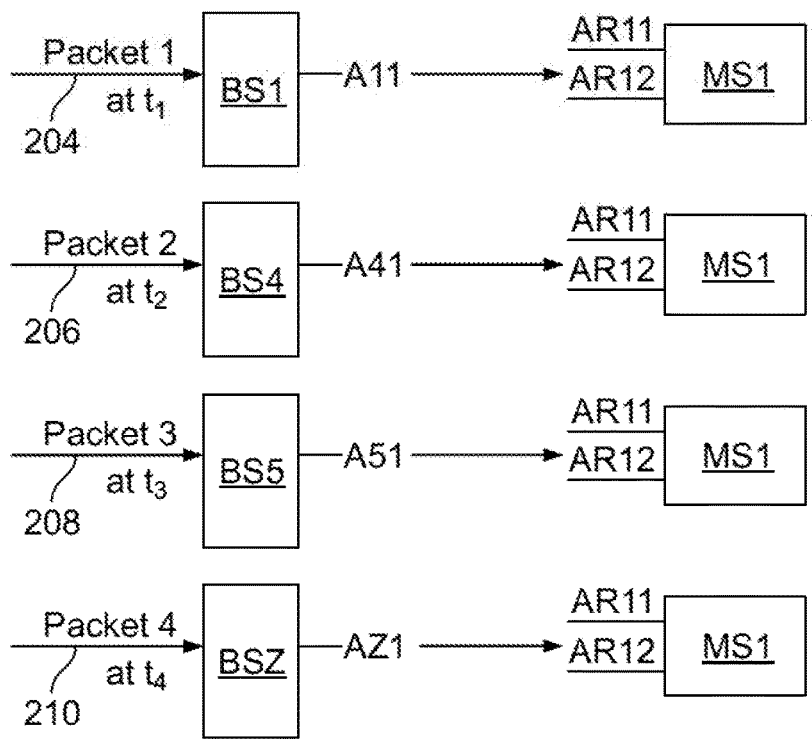
FIG. 2B is a diagram illustrating transmission of a data packet sequence using antenna sets that each comprise a single antenna.
Figure 2C:
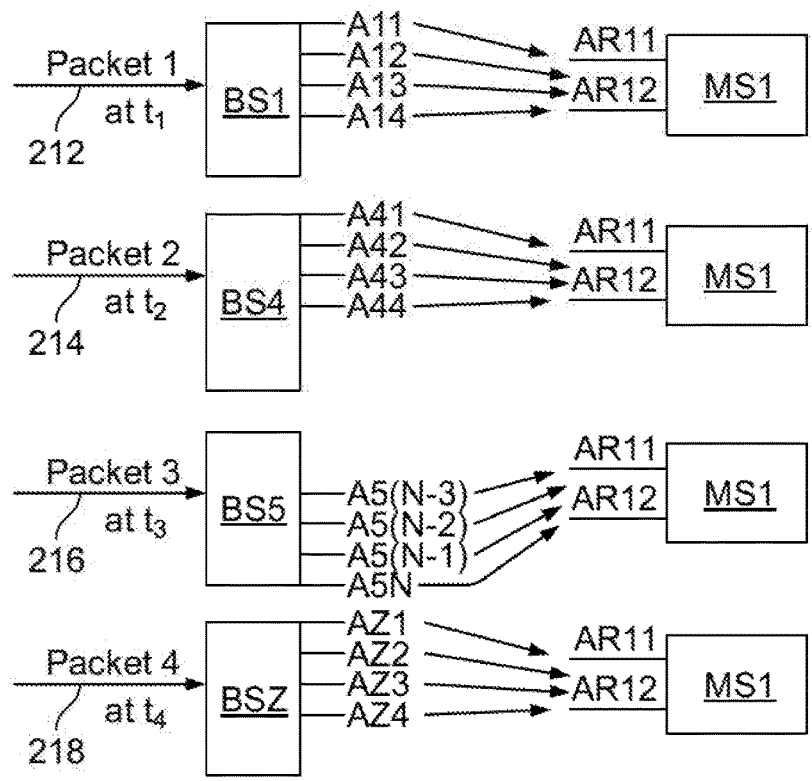
FIG. 2C is a diagram illustrating transmission of a data packet sequence using antenna sets that each comprise four antennas.
Figure 2D:
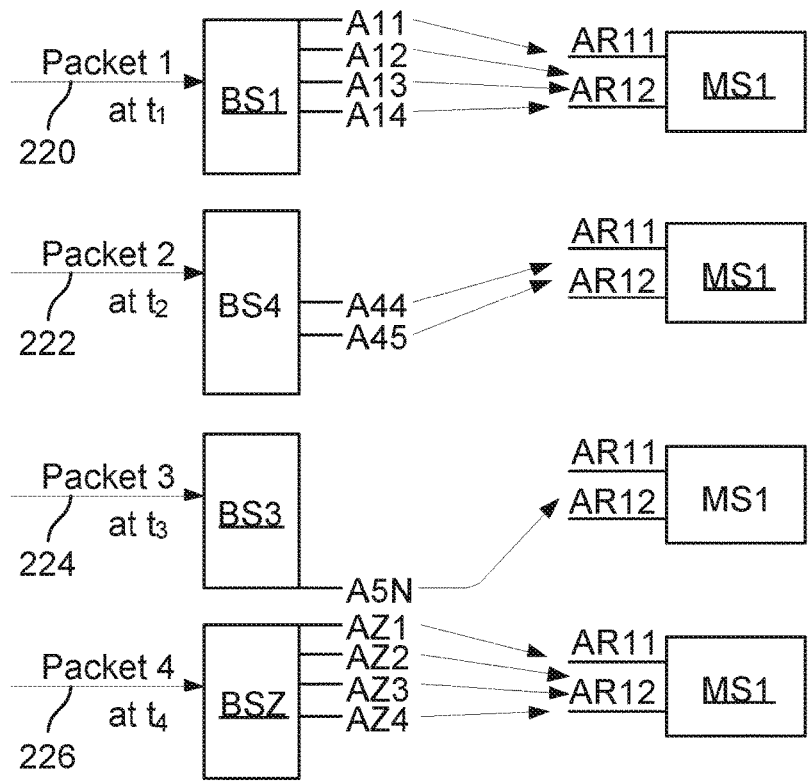
FIG. 2D is a diagram illustrating transmission of a data packet sequence using antenna sets having different numbers of antennas.

In operation of wireless network 200, network controller 202 may receive data packets from a core network, and route the data packets for transmission to one of mobile devices MS1-MS3 using pseudo-randomly selected antenna sets configured from the antennas on base stations BS1-BSZ. Network controller 202 may route alternate groups of one or more data packets of the received data packets to a different antenna set/base station of base stations BS1-BSZ by selecting an antenna set of the plurality of antennas for network 200 based on a pseudo-random distribution pattern. The antenna sets implemented on base stations BS1-BSZ may include any number of antennas. Based on the antenna set selection, network controller 202 routes the groups of one or more packets to the base station on which the selected antenna set is implemented for transmission to one of mobile devices MS1-MS3. FIGS. 2B-2D illustrate use of example antenna sets that may be implemented in network 200 of FIG. 2A to achieve spatial diversity.

FIG. 2B is a diagram illustrating example transmission of a data packet sequence in network 200 of FIG. 2A using pseudo-randomly selected antenna sets that each comprises a single antenna on different base stations to achieve spatial diversity. FIG. 2B shows a sequence of four data packets, packet 1, packet 2, packet 3, and packet 4, that are received at network controller 202 from a core network and addressed to mobile device MS1.

At time $t_1$ 204, packet 1 is routed to the antenna set comprising antenna A11 on base station BS1 for transmission to mobile device MS1. Next, at time $t_2$ 206 packet 2 is shown being routed to the antenna set comprising antenna A41 on base station BS4 for transmission to mobile device MS1. Then at time $t_3$, 208, packet 3 is routed to the antenna set comprising antenna A51 on base station BS5 for transmission to mobile device MS1, and at time t4 210, packet 4 is routed to the antenna set comprising antenna AZ1 on base station BSZ for transmission to mobile device MS1.

FIG. 2C is a diagram illustrating an example transmission of a data packet sequence in network 200 using pseudo-randomly selected antenna sets that each comprises four antennas on different base stations to achieve spatial diversity. FIG. 2C shows a sequence of four data packets, packet 1, packet 2, packet 3, and packet 4 that are received at network controller 202 from a core network and addressed to mobile device MS1.

At time $t_1$ 212, packet 1 is routed to the antenna set comprising antennas A11, A12, A13, and A14 on base station BS1 for transmission to mobile device MS1. Next, at time $t_2$ 214, packet 2 is shown being routed to the antenna set comprising antennas A41, A42, A43, and A44 on base station BS4 for transmission to mobile device MS1. Then at time $t_3$, 216, packet 3 is routed to the antenna set comprising antennas A5N-A5 (N–3) on base station BS5 for transmission to mobile device MS1, and at time $t_4$ 218, packet 4 is routed to the antenna set comprising antennas AZ1, AZ2, AZ3, and AZ4 on base station BSZ for transmission to mobile device MS1.

FIG. 2D is a diagram illustrating example transmission of a data packet sequence in the network 200 using pseudo-randomly selected antenna sets that each comprises a different number of antennas on different base stations to achieve spatial diversity. FIG. 2D shows a sequence of four data packets, packet 1, packet 2, packet 3, and packet 4 that are received at network controller 202 from a core network and addressed to mobile device MS1.

At time $t_1$ 220, packet 1 is routed to the antenna set comprising antennas A11, A12, A13, and A14 on base station BS1 for transmission to mobile device MS1. Next, at time t2 222, packet 2 is shown being routed to the antenna set comprising antennas A44 and A45 on base station BS4 for transmission to mobile device MS1. Then at time $t_3$, 224, packet 3 is routed to the antenna set comprising antenna A5N on base station BS5 for transmission to mobile device MS1, and at time $t_4$ 226, packet 4 is routed to the antenna set comprising antennas AZ1, AZ2, AZ3, and AZ4 on base station BSZ for transmission to mobile device MS1.

Figure 3:
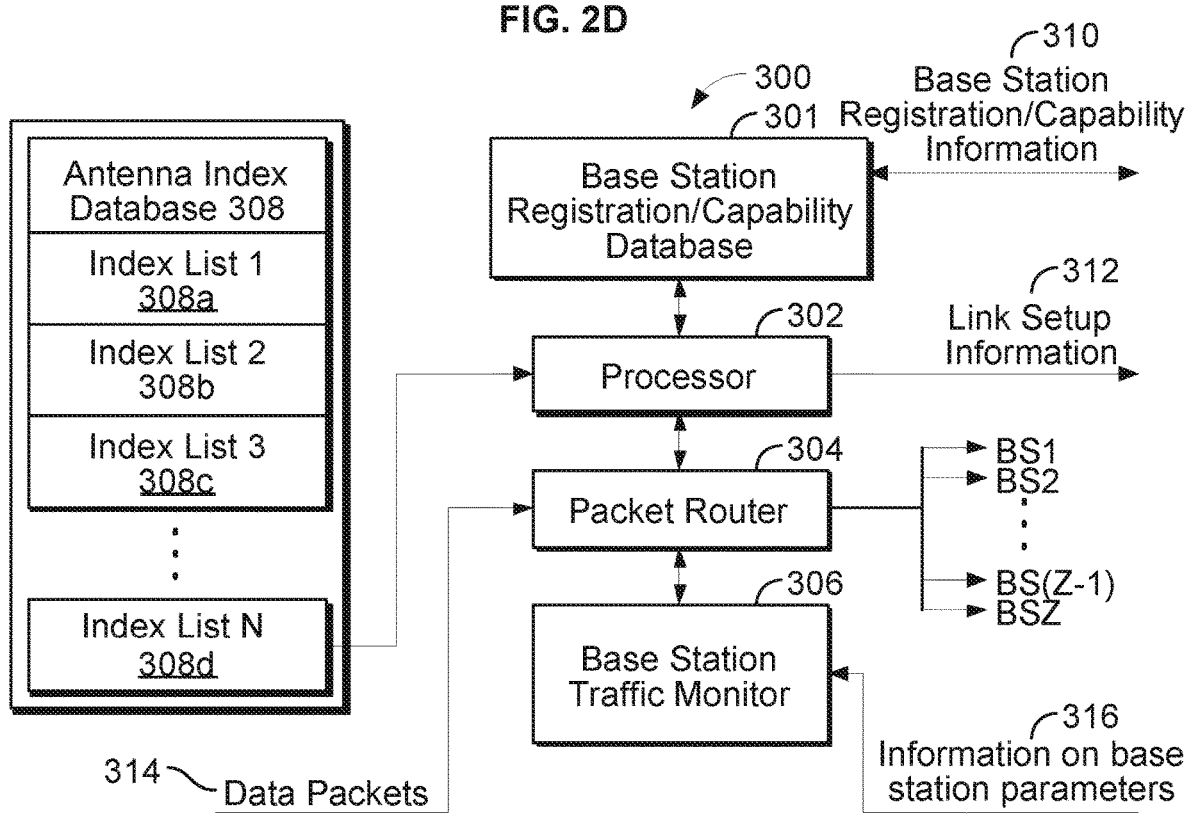
FIG. 3 is a simplified block diagram illustrating portions of an example controller.

FIG. 3 is a simplified block diagram illustrating portions of an example network controller 300 for providing spatial diversity for data transmissions from a multi-base station network. In an example implementation, network controller 300 may be implemented in a wireless network to provide the functions of network controller 104 of FIG. 1 or network controller 202 of FIG. 2A. The functions of network controller 300 may be explained by reference to an implementation in which network controller 300 is configured as network controller 202 of FIG. 2A.

Network controller 300 includes base station registration/capability database 301, processor 302, packet router 304, base station traffic monitor 306, and antenna index database 308. Processor 302 provides overall control of network controller to implement functions used to receive and route data packets according to the embodiments.

Base station registration/capability database 308 may be configured to obtain and store information on the base stations that are under the control of network controller 300. For example, in an implementation in which network controller 202 of FIG. 2A is implemented as network controller 300, base station/capability database 308 may communicate with base stations BS1-BSZ to obtain registration/capability information about the existence, identity, and antenna capabilities of these base stations. Processor 302 may use the registration/capability information to configure information in antenna index database 308 that may be used for selecting antenna sets and performing routing decisions for incoming data packets.

Antenna index database 308 may be utilized to store one or more antenna index lists. In FIG. 3, antenna index database 308 is shown as including N index lists, index list 1 308a, index list 2 308b, index list 3 308c, . . . , index list N 308d. Each antenna index list may comprise a list of indexes, where each index in the list represents an antenna set that includes one or more antennas. For example, each antenna index list in antenna index database 308 may comprise a list of indexes ix, for x=1 . . . n, where each ix identifies an antenna set. Each antenna index ix may also be associated with additional information related to the antenna set represented by the antenna index. For example, each antenna index ix may be associated with a base station identifier BSX that identifies the base station on which the antenna set represented by the antenna index ix is implemented. In this case the antenna index list may comprise a list of information (ix, BSX), for x=1 . . . n. When an antenna set represented by an antenna index ix is selected as the antenna set to which a data packet is to be routed, the base station identifier, BSX, may be used to route the data packet to the appropriate base station.

Depending on the configurations of the base stations BS1-BSZ in network 200, antenna index database 308 may include any number N of index lists. For example, if each base station BS1-BSZ has only single antenna capability, antenna index database 308 may comprise only one index list. In this case each index in index list 1 may comprise a list of information (ix, BSX), for x=1 . . . n, where each BSX identifies a base station associated with the single antenna of the antenna set assigned to index ix. Similarly, if each base station BS1-BSZ is configured to transmit using 4 antennas, antenna index database 308 may also comprise only one index list. In this case each index in index list 1 may comprise a list of information (ix, BSX), for x=1 . . . n, where each BSX identifies a base station associated with the 4 antennas of the antenna set assigned to index ix. Depending on the physical configuration of network 200, n may be set at the number of all base stations BS1-BSZ in network 200, or set at a number of base stations in a subset of the base stations BS1-BSZ.

The particular antenna sets and base stations associated with an index list may be configured so that spatial diversity is provided over the area covered by all base stations of network 200 or over an area covered by a subset of the base stations of network 200. In other implementations, different index lists in antenna index database 308 may be configured for antenna sets and base stations of different areas of network 200 in which a mobile device receiving data packets may be located.

In another implementation, each antenna index ix may also be associated with an antenna set identifier Ax that identifies the physical antennas of an antenna set represented by the antenna index ix. The antenna set identifier Ax may identify the physical antennas as a group, or comprise identifiers of individual antennas. In this case the antenna index list may comprise a list of information (ix, BSX, Ax), for x=1 . . . n. When an antenna set represented by the index ix is selected as the antenna set to which a data packet is to be routed, the antenna set identifier Ax may be attached to the data packet for use by the base station BSX in resolving any ambiguity as to which antennas of base station BSX should be used to implement the antenna set and transmit the data packet. Use of the antenna set identifier may be advantageous when it is desired to direct the base station to transmit on particular antennas. For example, in some implementations a packet may be routed to an antenna set of a base station that has more antennas than are in the antenna set. In one implementation, the antenna set identifier may be the value of the index itself, and the base station may have information stored that allows it to identify the antennas from the index. In another implementation in which ambiguity exists regarding which antennas to transmit on, once a packet is routed to a base station the base station may decide which antennas to transmit on. In this implementation, the antenna set identifier is not needed and may be omitted.

Packet router 304 receives data packets 314 from a core network and routes the data packets to antenna sets on base stations BS1-BSZ under the control of processor 302. Base station traffic monitor 306 may monitor activity of the base stations and provide the activity information for use by processor 302 in making routing decisions. For example, base station traffic monitor 306 may obtain information on base station parameters 316 and use the information to determine if the activity level of a base station associated with an antenna set is below a predetermined level before routing a data packet to the antenna set/base station.

Figure 4:
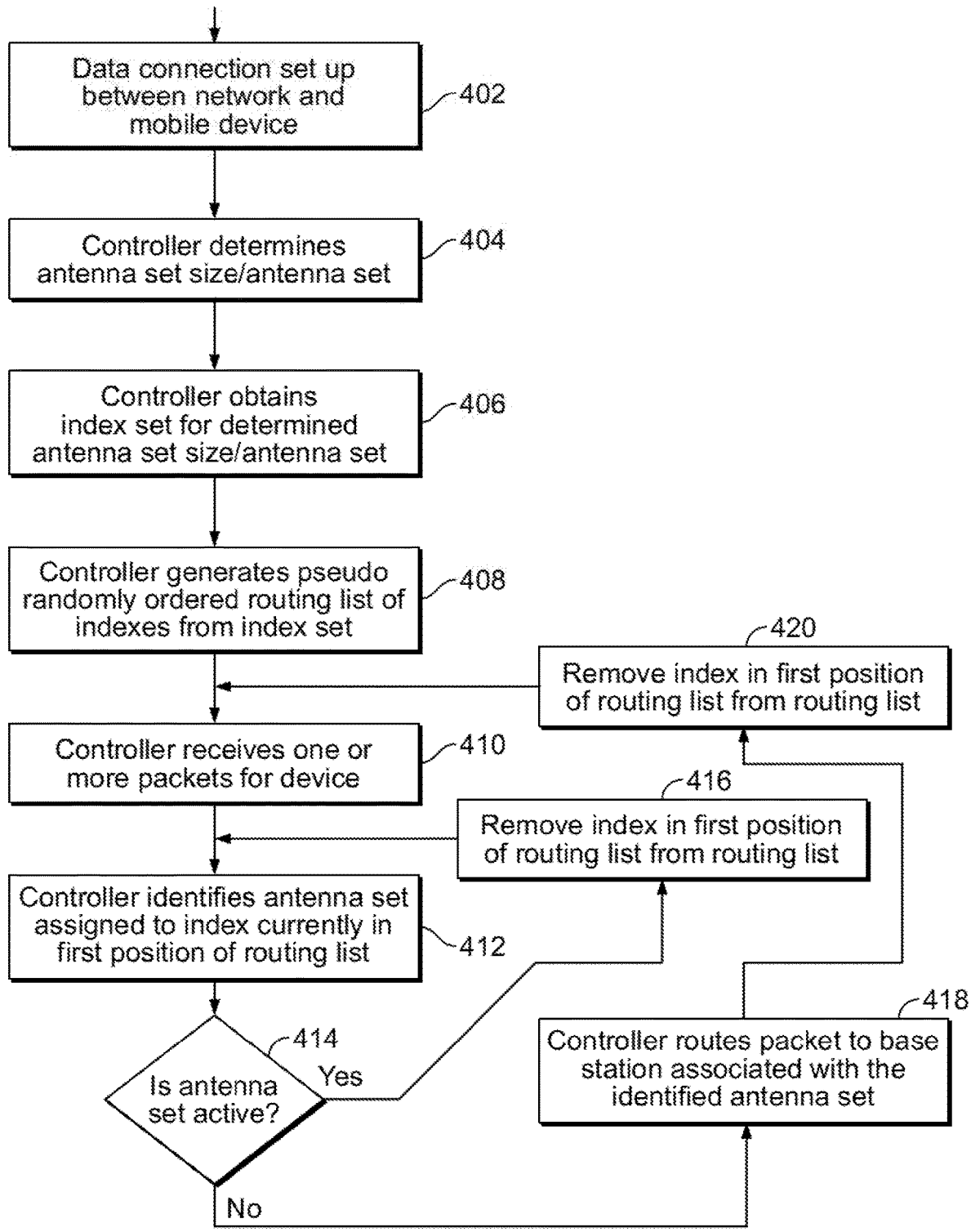
FIG. 4 is a flow diagram illustrating example operations performed by an example controller; and, FIG. 5 is a block diagram showing an example controller.

The operation of network controller 300 may be explained with reference to the flow diagram of FIG. 4. FIG. 4 is a flow diagram illustrating example operations performed by an example network controller when routing a sequence of data packets. FIG. 4 may be explained by using the example implementation of network controller 300 implemented as network controller 202 of FIG. 2A.

The process begins at 402 where a data connection is set up between network 200 and a mobile device. For example, network controller 202 may set up a packet data connection with mobile device MS1 in which MS1 is assigned a MAC ID using one of base stations BS1-BSZ. As part of the packet data connection setup, network controller 202 may assign one or more channels on which base stations BS1-BSZ are to transmit data packets to mobile device MS1 in order that mobile device MS1 is able to receive data packets from multiple base stations.

At 404, processor 302 of controller 300 determines an antenna set size and/or an antenna set of network 200 for use in transmitting to MS1. The determination of antenna set size and/or antenna set may be based on network conditions and/or available resources, or may be determined based on a default value.

For example, processor 302 may determine that only antenna sets comprising a single antenna will be used to transmit data to MS1 from base stations BS1-BSZ of network 200. In this case, at 406, processor 302 obtains an index list from antenna index database 308 that comprises antenna sets of single antennas. For example, processor 302 may obtain an index list X comprising the elements of x1, x2, x3, x4, x5, . . . , xZ, where each element is associated with the antennas sets A11, A21, A31, A41, A51, . . . , AZ1, respectively.

In another example, processor 302 may determine that antenna sets comprising N antennas will be used to transmit data to MS1 from each of base stations BS1-BSZ of network 200. In this case, at 406, processor 302 obtains an index list from antenna index database 308 for antenna sets of N antennas. For example, processor 302 may obtain an index list Y comprising the elements of y1, y2, y3, y4, y5, . . . , yZ, where the elements are associated with the antenna sets (A11 . . . A1N), (A21 . . . A2N), (A31 . . . A3N), (A41 . . . A4N), (A51 . . . A5N), . . . , (AZ1 . . . AZN), respectively.

In other implementations, processor 302 may determine that antenna sets comprising different numbers of antennas will be used to transmit data to MS1 from base stations BS1-BSZ of network 200. In this case, at 406, processor 302 may obtain an index list from antenna index database 308 that includes antenna sets with different numbers of antennas. For example, processor 302 may obtain an index list Z comprising the elements of z1, z2, z3, z4, z5, . . . , zZ, where the elements are associated with the antenna sets (A11, A12), (A21, A22), (A31), (A41), (A51, A52), . . . , (AZ1), respectively.

Next, at 408, processor 302 generates a distribution pattern, comprising a routing list in which the indexes in the index list have been pseudo-randomly ordered, from the index list obtained from antenna index database 308 at 404. The distribution pattern may be used by processor 302 for routing of data packets to base stations BS1-BSZ to achieve spatial diversity according to the embodiments. For example, if the example index list X was obtained at operation 404, processor 302 may generate a routing list comprising the elements x1, x2, x3, x4, x5, . . . , xZ configured in a pseudo-random sequence. In an implementation, the pseudo-randomly ordered list of xi's may be generated by a pseudo-random generator and be of a sequence length N greater than Z. The sequence length N may be determined based on network parameters. In an example, a linear feedback shift register (LFSR) may be utilized to generate the routing list base on a pseudo-random sequence provided at the outputs of the LFSR. The routing list may be configured so the pseudo-randomly ordered elements are each placed in a position from a first position to an Nth position in the routing list. Depending on the implementation, an index xi may appear multiple times in the routing list.

At 410, processor 302 controls packet router 304 of network controller 300 to receive and process one or more data packets 314 from the core network that include a MAC ID indicating that the one or more data packets are addressed to destination mobile device MS1. The one or more data packets may be queued at packet router 304 as the data packets are received. At 412, processor 302 identifies the antenna set assigned to the index value currently in the first position of the routing list. At 414, processor 302 determines if the antenna set identified at 412 is active. Processor 302 may determine if the antenna set identified at 412 is active by determining if an activity level associated with the identified antenna set is below a threshold level. The activity level associated with the identified antenna set may be a measure of the activity of a base station on which the identified antenna set is implemented. For example, if the identified antenna set includes an antenna such as antenna A11 and/or antenna A12 on base station BS1, the activity level may be a measure of the activity of base station BS1. In example implementations, the activity level may be a measure of the fill level of a buffer on base station BS1 that stores data packets in a queue for transmission from antenna A11 and/or antenna A12. The activity level may also be a measure of the fill level of an input buffer on base station BS1 that stores queued data packets for processing at base station BS1. In other implementations the activity level may also be a more generic measure, for example, a current measure of traffic throughput of base station BS1. The consideration of the activity level associated with the antenna set at 414 may allow congestion in the network to be avoided when routing data packets for transmission to mobile device MS1 through pseudo-randomly selected base stations. If, at 414, it is determined that the antenna set identified at 412 is not active the process moves to 418. At 418, processor 302 controls packet router 304 to route the data packet next in its queue for MS1 to the base station of BS1-BSZ that is associated with the antenna set identified at 412. The data packet is then transmitted from the antenna set to mobile device MS1. The base station of BS1-BSZ that transmits the data packet to MS1 will transmit the data packet on a channel that was assigned to MS1 during set up of the packet data connection at operation 402. In an implementation, the base station may determine the channel based on the data packet's MAC ID and information stored in the base station. In another implementation network controller may append channel information to the data packet when the data packet is routed to the base station. In implementations in which the antenna set includes antennas configured on two or more base stations, processor 302 will route the data packet to the two or more base stations of BS1-BSZ on which the antenna set is configured. From 418 the process moves to 420.

If, at 414, it is determined that the antenna set is active, the process moves to 416. At 416, processor 302 removes the index in the first position of the routing list from the routing list and moves the index that was in the second position (index next on the list) to the first position on the routing list. The process moves to 412 where processor 302 identifies the antenna set assigned to the index moved to the first position of the routing list at 416. At 414, processor 302 determines if the antenna set identified at 412 is active. If it is determined that the antenna set is active the process moves to 416. The process repeats operations 416, 412, and 414 until an antenna set identified at 412 is determined not to be active at 414 and the process moves to 418. At 418, processor 302 controls packet router 304 to route the data packet next in its queue for MS1 to the base station of BS1-BSZ that is associated with the antenna set identified at 412. The data packet is then transmitted from the antenna set to mobile device MS1. In implementations in which the antenna set includes antennas configured on two or more base stations, processor 302 will route the data packet to the two or more base stations of BS1-BSZ on which the antenna set is configured. From 418 the process moves to 420.

At 420, processor 302 removes the index in the first position of the routing list from the routing list and the index that was in the second position (index next on the list) is moved to the first position on the routing list. From 420 the process moves to 410. The next data packet in the queue addressed to device MS1 is then processed though operations 410, 412, 414, 416, 418, and 420. Operations 410, 412, 414, 416, 418, and 420 may be repeated for each data packet addressed to mobile device MS1 that is received and queued in packet router 304 of controller 300.

Figure 5:
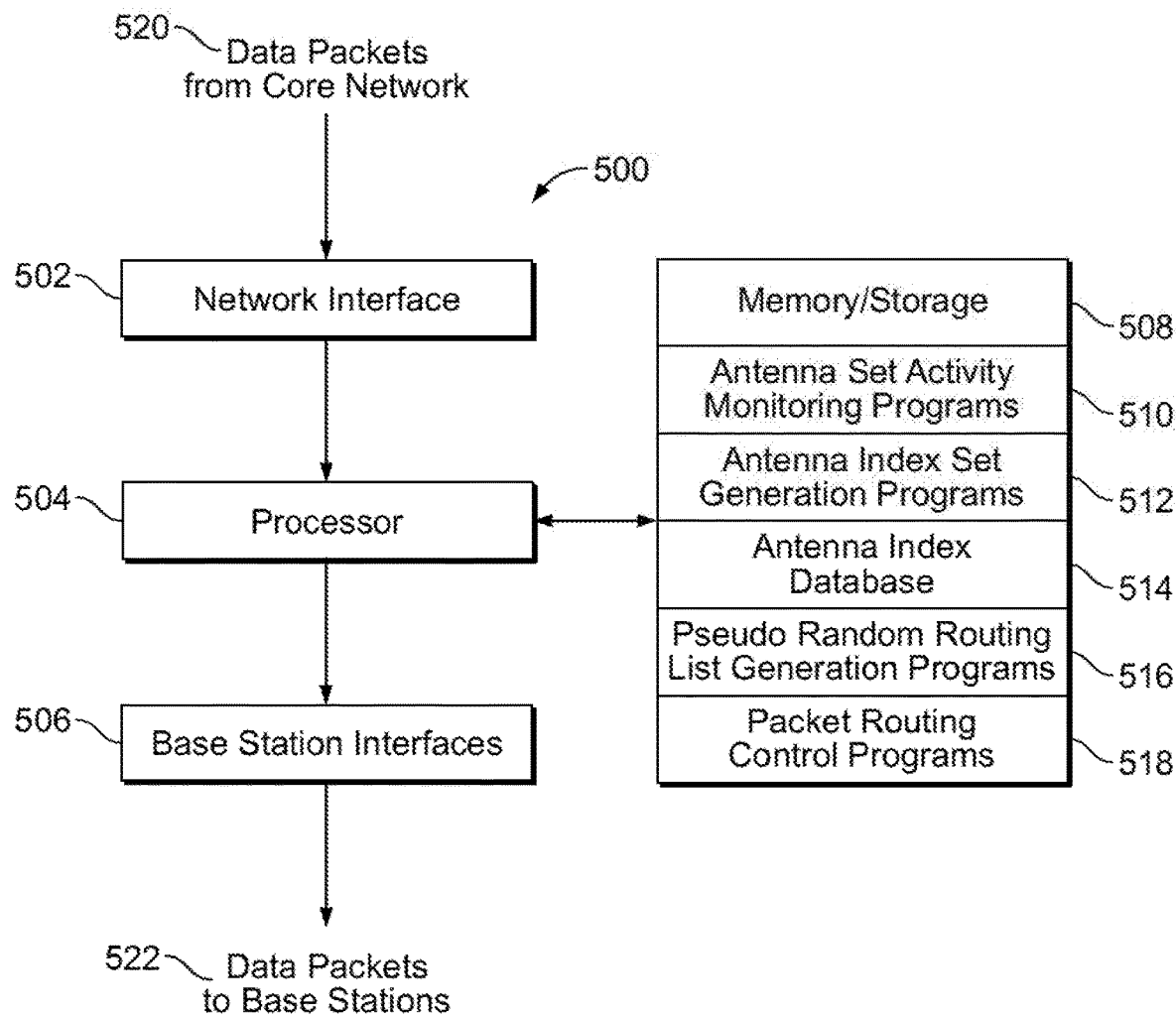

FIG. 5 is a block diagram showing an example network controller. Network controller 500 represents a possible implementation of network controller 104 and network controller 202 of FIG. 1 and FIG. 2A, respectively. Network controller 500 includes processor 504, network interface 502, base station interfaces 506, and memory/storage 508. Network controller 500 connects to a backend network over network interface 502 to receive data packets 520 for routing to base stations 522 through base station interface 506. Memory/storage 508 includes code and program/instructions for antenna set activity monitoring programs 510, antenna index list generation programs 512, antenna index database 514, pseudo-random routing list generation programs 516, and packet routing control programs 518.

Processor 504 may comprise one or more processors, or other control circuitry or any combination of processors and control circuitry that provide overall control of network controller 500 according to the disclosed embodiments. Memory/storage 508 may be implemented as any type of as any type of computer readable storage media, including non-volatile and volatile memory. Network interface 502 may be any type of interface, wireless or otherwise, that connects to a core network such as the internet or a MPLS network. Base station interface 506 may be any type of interface, wireless or otherwise, that connects to base stations of a wireless network.

In an implementation, execution of antenna set activity monitoring programs 510 by processor 504 causes controller 500 to implement the functions of base station monitor 306 of FIG. 4, and the operations described as performed at 414 of FIG. 4. Antenna index database 514 may be configured similar to antenna index database 308 of FIG. 3. The antenna index database 514 may be generated through execution of antenna index list generation programs 512 by processor 504. When network controller 500 operates to receive and route data packets, processor 504 may execute pseudo-random routing list generation programs 516 and packet routing control programs 518 to perform the functions described for operations 408 through 420 of FIG. 4.

The example embodiments disclosed herein may be described in the general context of processor-executable code or instructions stored on memory that may comprise one or more computer readable storage media (e.g., tangible non-transitory computer-readable storage media such as memory 508). As should be readily understood, the terms "computer-readable storage media" or "non-transitory computer-readable media" include the media for storing of data, code and program instructions, such as memory 508, and do not include portions of the media for storing transitory propagated or modulated data communication multi-carrier signals.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuit, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

The disclosed implementations include an apparatus comprising one or more processors and memory in communication with the one or more processors. The memory comprises code that, when executed, causes the one or more processors to receive a first group of data bits, select a first antenna set from a plurality of antenna sets based on a distribution pattern, wherein the first antenna set is associated with a first base station of a plurality of base stations, route the first group of data bits to the first base station for transmission to a destination device, receive a second group of data bits, select a second antenna set from the plurality of antenna sets based on the distribution pattern, wherein the second antenna set is associated with a second base station of the plurality of base stations, and, route the second group of data bits to the second base station for transmission to the destination device. The code may further cause the one or more processors to select the first antenna set from the plurality of antenna sets by controlling the one or more processors to identify the first antenna set from the plurality of antenna sets based on the distribution pattern, determine that an activity level associated with the first antenna set is below a threshold level, and select, in response to the determination that the activity level is below the threshold level, the first antenna set from the plurality of antenna sets. The activity level associated with the first antenna set may comprise a measure of the activity of the first base station of the plurality of base stations that is associated with the first antenna set. The distribution pattern may comprise a pseudo-randomly generated list of the plurality of antenna sets. The first antenna set may be associated with the first base station and a third base station of a plurality of base stations, and the code may further cause the one or more processors to route the first group of data bits by controlling the one or more processors to route the first group of data bits to the first base station and to the third base station for transmission to the destination device. The first antenna set may comprise a single antenna. The first antenna set may comprise two or more antennas. The code may further cause the one or more processors to route the first group of data bits by controlling the one or more processors to provide information to the first base station identifying antennas of the first antenna set for transmitting the first group of data bits to the destination device. The first and second group of data bits may comprise a first and second data packet, respectively. The code may further cause the one or more processors to determine the plurality of antenna sets based on the capabilities of each of the plurality of base stations, assign an index to each of the plurality of antenna sets to create an index set list, and generate a pseudo-randomly ordered list from the index set list, wherein, the one or more processors randomly select the first antenna set from the plurality of antenna sets by selecting the first antenna set from the pseudo-randomly ordered list.

The disclosed implementations also include a system comprising a plurality of base stations including a plurality of antenna sets operable to transmit to a mobile device, a controller coupled to each of the plurality of base stations, the controller configured to receive a plurality of data packets intended for the mobile device from a network, and route each of the plurality of data packets to the mobile device by alternately distributing groups of the plurality of data packets among the plurality of base stations and the plurality of antenna sets for transmission to the mobile device, wherein a first group of the plurality of data packets is transmit to the mobile device using at least one first base station and a first antenna set, and a second group of the plurality of data packets is transmit to the mobile device using at least one second base station, different from the at least one first base station, and a second antenna set. Each of the plurality of antenna sets may comprise a single antenna. Each of the plurality of antenna sets may comprise a plurality of antennas. At least one of the antenna sets may be implemented on more than one of the plurality of base stations. The controller may alternately distribute the groups of the plurality of data packets among the plurality of base stations and plurality of antenna sets, further, by determining that an activity level associated with the at least one first base station is below a threshold level and, in response to the determination that the activity level is below the threshold level, routing the first group of the plurality of data packets to the at least one first base station and the first antenna set. The controller may further send information to the at least one first base station identifying antennas of the first antenna set on which to transmit the first group of data packets to the mobile device.

The disclosed implementations further include a method comprising configuring a plurality of antenna sets, wherein the plurality of antenna sets is distributed over a plurality of base stations including at least one first base station and at least one second base station, receiving a first at least one data packet addressed to a mobile device, selecting a first antenna set of the plurality of antenna sets based on distribution pattern of the plurality of antenna sets, wherein the at least one first base station is associated with the selected first antenna set, forwarding the first at least one data packet to the at least one first base station for transmission to the mobile device, receiving a second at least one data packet addressed to a mobile device, selecting a second antenna set of the plurality of antenna sets based on the distribution pattern of the plurality of antenna sets, wherein the at least one second base station is associated with the selected second antenna set, and forwarding the second at least one data packet to the at least one second base station for transmission to the mobile device. The distribution pattern of the plurality of antenna sets may comprise a pseudo-randomly ordered list of the plurality of antenna sets. The at least one first base station and at least one second base station may each comprise at least one different base station. The selecting the first antenna set may comprise identifying the first antenna set based on the distribution pattern of the plurality of antenna sets, determining that an activity level associated with the first antenna set is below a threshold level, and selecting, in response to the determination that the activity level is below the threshold level, the first antenna set.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A network controller configured to distribute transmission of a plurality of data groups to a destination device in a spatially diversified manner via a plurality of antenna sets without the network controller transmitting any of the data groups directly to the destination device, the plurality of antenna sets located at a plurality of different locations within a coverage area of a network, the network controller in communication with a plurality of base stations associated with the plurality of antenna sets, respectively, the network controller comprising:
   a processor; and
   a memory in communication with the processor, the memory comprising executable instructions that, when executed by the processor, cause the processor to control the network controller to perform functions of:
      receiving the plurality of data groups to be transmitted to the destination device, each data group comprising a plurality of data bits;
      generating a distribution pattern comprising a randomly generated list of the antenna sets;
      based on the distribution pattern, selecting, from the plurality of antenna sets, a first antenna set for transmitting a first data group of the received data groups to the destination device, wherein the first antenna set is associated with a first base station of the plurality of base stations and comprises a first number of antennas;
      routing, to the first base station, the first data group of data bits for transmission to the destination device;
      based on the distribution pattern, selecting, from the plurality of antenna sets, a second antenna set for transmitting a second data group of the received data groups to the destination device, wherein the second antenna set is associated with a second base station of the plurality of base stations and comprises a second number of antennas, the second number being different from the first number for the spatially diversified transmission of the data groups; and
      routing, to the second base station, the second data group for transmission to the destination device.

2. The network controller of claim 1, wherein, for selecting the first antenna set, the instructions, when executed by the processor, further cause the processor to control the apparatus to perform a function of:
   identifying, based on the distribution pattern, the first antenna set from the plurality of antenna sets;
   determining that an activity level associated with the first antenna set is below a threshold level; and
   selecting, based on the determination that the activity level is below the threshold level, the first antenna set for transmitting the first data group.

3. The network controller of claim 2, wherein the activity level associated with the first antenna set comprises a measure of an activity of the first base station.

4. The network controller of claim 1, wherein the randomly generated list of the antenna sets is pseudo-randomly generated.

5. The network controller of claim 1, wherein the first antenna set comprises a single antenna.

6. The network controller of claim 1, wherein the first antenna set comprises two or more antennas.

7. The network controller of claim 1, wherein the instructions, when executed by the processor, further cause the processor to control the apparatus to perform a function of providing, to the first base station, information identifying each antenna of the first antenna set selected for transmitting the first data group to the destination device.

8. The network controller of claim 1, wherein the first and second data groups comprise first and second data packets, respectively, in a sequence of data packets.

9. The network controller of claim 1, wherein, for generating the distribution pattern, the instructions, when executed by the processor, further cause the processor to control the apparatus to perform functions of:
   assigning an index to each antenna set to create an index set list; and
   generating, from the index set list, a pseudo-randomly ordered list of the antenna sets.

10. A method of operating a network controller for distributing transmission of a plurality of data groups to a destination device in a spatially diversified manner via a plurality of antenna sets without the network controller transmitting any of the data groups directly to the destination device, the plurality of antenna sets located at a plurality of different locations within a coverage area of a network, the network controller in communication with a plurality of base stations associated with the plurality of antenna sets, respectively, the method comprising:
   receiving the plurality of data groups to be transmitted to the destination device, each data group comprising a plurality of data bits;
   generating a distribution pattern comprising a randomly generated list of the antenna sets;
   based on the distribution pattern, selecting, from the plurality of antenna sets, a first antenna set for transmitting a first data group of the received data groups to the destination device, wherein the first antenna set is associated with a first base station of the plurality of base stations and comprises a first number of antennas;
   routing, to the first base station, the first data group of data bits for transmission to the destination device;
   based on the distribution pattern, selecting, from the plurality of antenna sets, a second antenna set for transmitting a second data group of the received data groups to the destination device, wherein the second antenna set is associated with a second base station of the plurality of base stations and comprises a second number of antennas, the second number being different from the first number for the spatially diversified transmission of the data groups; and
   routing, to the second base station, the second data group for transmission to the destination device.

11. The method of claim 10, wherein selecting the first antenna set comprises:
   identifying, based on the distribution pattern, the first antenna set from the plurality of antenna sets;
   determining that an activity level associated with the first antenna set is below a threshold level; and
   selecting, based on the determination that the activity level is below the threshold level, the first antenna set for transmitting the first data group.

12. The method of claim 11, wherein the activity level associated with the first antenna set comprises a measure of an activity of the first base station.

13. The method of claim 10, wherein the the randomly generated list of the antenna sets is pseudo-randomly generated.

14. The method of claim 10, wherein the first antenna set comprises a single antenna.

15. The method of claim 10, wherein the first antenna set comprises two or more antennas.

16. The method of claim 10, further comprising providing, to the first base station, information identifying each antenna of the first antenna set selected for transmitting the first data group to the destination device.

17. The method of claim 10, wherein the first and second data groups comprise first and second data packets, respectively, in a sequence of data packets.

18. The method of claim 10, wherein generating the distribution pattern comprises:
assigning an index to each antenna set to create an index set list; and
generating, from the index set list, a pseudo-randomly ordered list of the antennas.

19. A non-transitory computer readable medium containing instructions which, when executed by a processor, cause a network controller to perform functions for distributing transmission of a plurality of data groups to a destination device in a spatially diversified manner via a plurality of antenna sets without the network controller transmitting any of the data groups directly to the destination device, the functions comprising:
receiving the plurality of data groups to be transmitted to the destination device, each data group comprising a plurality of data bits, the plurality of antenna sets located at a plurality of different locations within a coverage area of a network, the network controller being in communication with a plurality of base stations associated with the plurality of antenna sets, respectively;
generating a distribution pattern comprising a randomly generated list of the antenna sets;
based on the distribution pattern, selecting, from the plurality of antenna sets, a first antenna set for transmitting a first data group of the received data groups to the destination device, wherein the first antenna set is associated with a first base station of the plurality of base stations and comprises a first number of antennas;
routing, to the first base station, the first data group of data bits for transmission to the destination device;
based on the distribution pattern, selecting, from the plurality of antenna sets, a second antenna set for transmitting a second data group of the received data groups to the destination device, wherein the second antenna set is associated with a second base station of the plurality of base stations and comprises a second number of antennas, the second number being different from the first number for the spatially diversified transmission of the data groups; and
routing, to the second base station, the second data group for transmission to the destination device.

* * * * *